United States Patent [19]

Blasnik

[11] Patent Number: 4,481,901
[45] Date of Patent: Nov. 13, 1984

[54] GEARSHIFT INDICATOR WITH RANGE ADJUSTMENT

[75] Inventor: William Blasnik, Englewood, N.J.
[73] Assignee: Thomas R. Morrison, N.Y.
[21] Appl. No.: 365,348
[22] Filed: Apr. 5, 1982
[51] Int. Cl.³ .................... G01D 5/02; F16H 35/00
[52] U.S. Cl. ............................ 116/28.1; 33/401; 116/62.4
[58] Field of Search ............... 116/62.4, 28.1, 56, 116/DIG. 20; 73/493, 509; 33/344, 346; 280/236; 474/82; 74/217 B

[56] References Cited

U.S. PATENT DOCUMENTS

| 1,567,347 | 12/1925 | Van Lynden | 73/509 X |
| 2,030,068 | 2/1936 | Martin | 33/346 |
| 2,362,616 | 11/1944 | Cloud | 33/333 |
| 2,869,366 | 1/1959 | Nitikman | 73/861.22 X |
| 2,879,940 | 3/1959 | Cornell | 116/28.1 X |
| 3,079,794 | 3/1963 | MacCready, Jr. | 73/189 |
| 3,732,787 | 5/1973 | Yamaguchi | 280/236 |
| 3,974,699 | 8/1976 | Morris et al. | 73/510 X |
| 3,991,624 | 11/1976 | Davis | 73/189 |
| 4,055,093 | 10/1977 | Ross | 116/28.1 |
| 4,091,667 | 5/1978 | Anderson et al. | 374/109 X |
| 4,206,638 | 6/1980 | Djorup | 73/189 |

FOREIGN PATENT DOCUMENTS 2394090 1/1979 France ............... 116/62.3

Primary Examiner—Daniel M. Yasich
Attorney, Agent, or Firm—Thomas R. Morrison

[57] ABSTRACT

A gearshift indicator measures the slope of a surface being traveled by a multi-geared vehicle and indicates the gear which should be used appropriately for the surface. An adjustment varies the relationship between slope and indication to accommodate headwind and the strength and characteristic of the rider.

1 Claim, 3 Drawing Figures ns, Ser. No. 304,923 for a Vehicle Gearshift Indicator, and Ser. Nos. 327,797 and 310,794, now abandoned, in favor of a continuation in part application Ser. No. 405,327 for a Cadence Meter.

GEARSHIFT INDICATOR WITH RANGE ADJUSTMENT

CROSS REFERENCE TO RELATED APPLICATIONS

The present application is related to my prior applications, Ser. No. 304,923 for a Vehicle Gearshift Indicator, and Ser. Nos. 327,797 and 310,794, now abandoned, in favor of a continuation in part application Ser. No. 405,327 for a Cadence Meter.

BACKGROUND OF THE INVENTION

The present invention is related to instruments for multi-geared vehicles and, more particularly, to instruments which measure the slop of the surface being traveled by the multi-speed vehicle and indicate the gear which should be used.

In my prior referenced applications, the disclosure, of which are herein incorporated by reference, I disclosed a bicycle gearshift indicator in which a mechanical device measures the slope of a surface being traveled by the bicycle and a pointer indicates on a specially calibrated scale the gear which should be appropriately used for the slope. That is, of course, a significant input to the requirement for gear selection. However, two additional parameters are also significant. These parameters are wind and strength of the rider. Wind measurement is a difficult task and usually calls for electronic equipment to accomplish. The relatively harsh environment of a bicyle is not favorable to electronic equipment.

OBJECTS AND SUMMARY OF THE INVENTION

Accordingly, it is an object of the present invention to provide a gear indicator for a multi-speed vehicle which responds to at least one parameter in addition to the slope of a surface.

It is a further object of the invention to provide a gearshift indicator which permits adjustment of the relationship between slope and indication.

It is a further object of the invention to provide a gearshift indicator having separate scales calibrated for at least two conditions of wind.

According to an aspect of the present invention, there is provided a gear indicator for a multi-speed vehicle, comprising means for measuring a slope of a surface on which the vehicle is disposed, means for indicating a gear appropriate for use with the slope, and means for changing a relationship between the slope and the gear.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
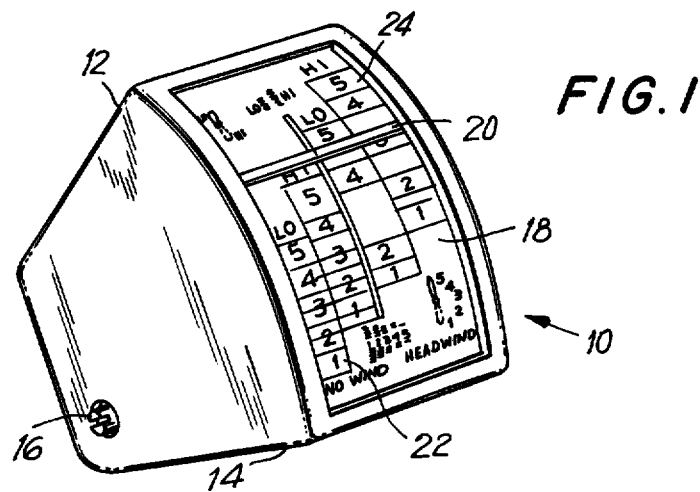
FIG. 1 is a perspective view of a gearshift indicator according to the present invention.

Referring now to FIG. 1, there is shown, generally at 10, a gearshift indicator having an upper body 12 which spans a full width of the instrument and a lower body 14 which extends substantially downward from one side of upper body 12. An adjustment screw 16 is located at a position centered near the bottom of lower body 14.

A scale shelf 18 is disposed in upper body 12 and a needle 20 is positioned to move adjacent to scale shelf 18. A first set of scales 22 are calibrated to indicate the correct gear that the user should use under conditions of no wind. A second pair of scales 24 are calibrated to indicate the gear the operator should use under conditions of headwind. In this way, wind conditions are accommodated as an additional parameter to slope.

Figure 2:
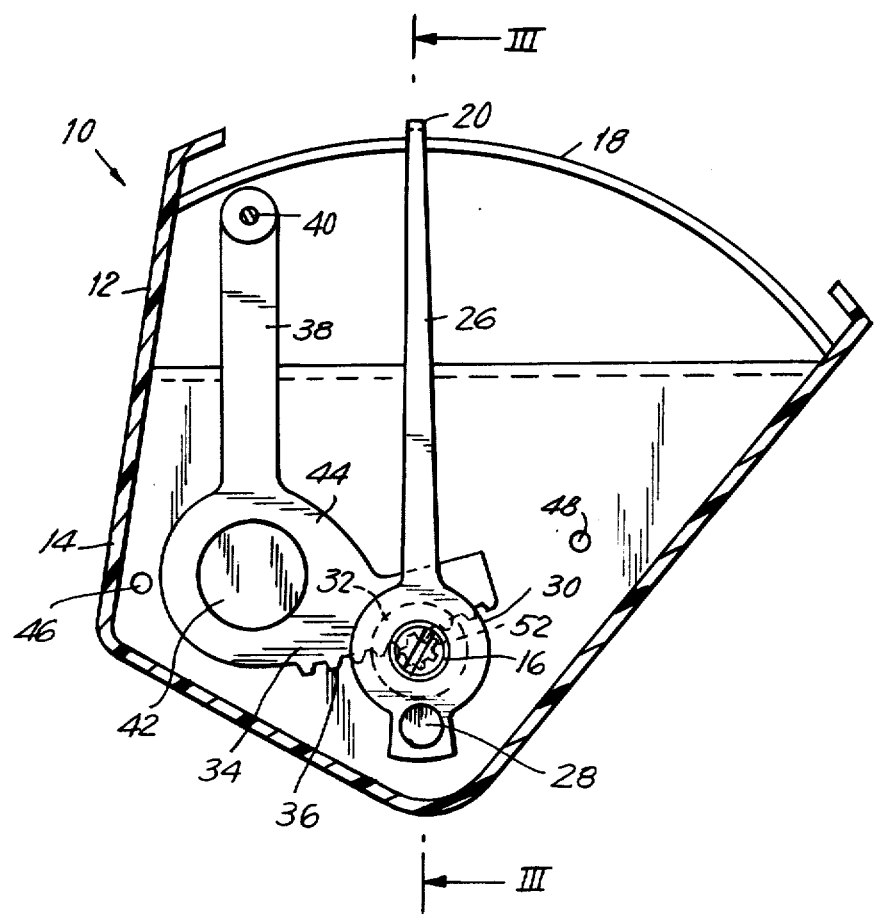
FIG. 2 is a side view of the gearshift indicator of FIG. 1 with a side cover removed to reveal internal components.

Referring now to FIG. 2 which represents a left side view of gearshift indicator 10 of FIG. 1 with the left cover removed to show the internal structure, needle 20 is seen to be supported on an arm 26 and counterbalanced by a counterbalance weight 28. Arm 26 is expanded into a generally circular coupling section 30 concentric with adjustment screw 16. A pinion support disc 32 (hidden by coupling section 30) is integrally formed with adjustment screw 16 and will be more fully described hereinafter.

A sector gear 34 having dependent teeth 36 is supported on an arm 38 pivoted at pivots 40, only one of which is shown. A weight 42 of any convenient relatively massive material such as steel or lead is disposed in an expanded portion 44 of arm 38.

Stops 46 and 48 which are preferably molded into the material of lower body 14 limit the travel of sector gear 34.

Figure 3:
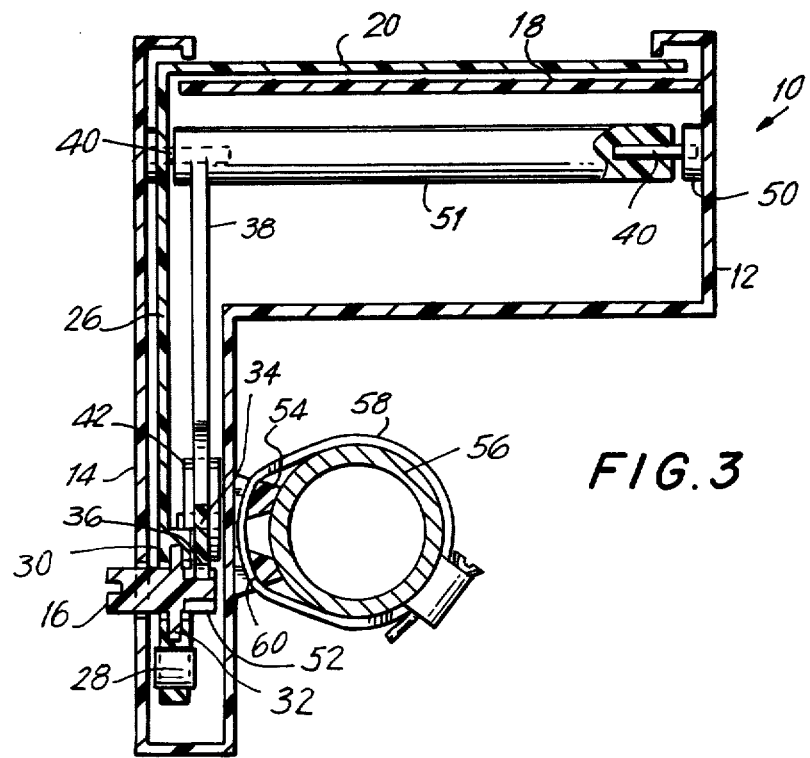
FIG. 3 is a cross section taken along II—II of FIG. 2.

Referring now to FIG. 3, first and second pivots 40 are seen to be mounted in bosses 50 aligned in opposite sides of upper body 12. A rod 51 extends between pivots 40 and supports arm 38 for rotation about pivot 40.

A pinion 52, preferably intergrally formed with pinion support disc 32 and adjustment screw 16, meshes with teeth 36 on sector gear 34. Frictional or other coupling techniques such as, for example, resilient detents between pinion support disc 32 and coupling section 30 maintain a substantially fixed angular relationship between pinion 52 and arm 26 until a purposeful manual adjustment of adjustment screw 16 has been exercised. That is, when adjustment screw 16 is forcefully rotated, the means retaining the fixed angular relationship between pinion support disc 32 and coupling section 30 is overcome and a new angular relationship is established. In this way, the relationship between street slope and gear indication can be changed to accommodate the weight, strength and aerodynamic drag of the rider. In the preferred embodiment of the invention, the coupling means is a detent in which a plastic finger (not shown) on one of coupling section 30 or pinion support disc 32 is resiliently engaged in one of the plurality of adjacent mechanical detents in the other thereof.

Gearshift indicator 10 is installed on a bicycle (not shown) by placing a pair of longitudinal stabilizing bars 54 against one side of a horizontal top tube 56 and clamping it there with a conventional screw-type clamp 58 which passes through slots 60 in both stabilizing bars 54. A padding material such as tape or foam (not shown) may be applied to top tube 56 before installation to prevent marring a painted surface.

Gearshift indicator 10 provides a means for measuring a slope of a surface on which the vehicle carrying it is disposed. The slope measurement is performed by pendant weight 42 supported on pivots 40 whose pendant position is communicated to needle 20 through dependent teeth 32 connected to pendant weight 42 and engaging pinion 52. The rotational position of pinion 53 is, in turn, coupled to arm 26 carrying pointer 20. As shown in FIG. 1, indicia on scale shelf 18 relate to low (lo) and high (hi) gear ranges and to gears 1-5 within such ranges. The relationship between the position of pointer 20 and the indicia on scale shelf 18 may be used by a rider of the vehicle as a guide to the correct gear to be used.

Although a purely mechanical device has been shown and described, it would be clear to one skilled in the art that the angle measurement could be performed electrically and the change in relationship between measured angle and indication could be performed either electrically or mechanically without departing from the scope of the present invention.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

I claim:

1. A gear indicator for a multi-speed vehicle comprising:
   a housing;
   means for securing said housing to said multi-speed vehicle;
   means in said housing for measuring a slope of a surface on which said vehicle is disposed;
   means for indicating a gear appropriate for use with said slope;
   said means for indicating including a rod pivoted to said housing, a first arm pivotably supported by said rod, and a pendant weight affixed to said arm;
   a sector gear affixed to said first arm;
   a pinion pivoted in said housing and engaging said sector gear;
   said sector gear being angularly deflected with respect to said pinion by an angular position of said vehicle disposed on said slope whereby said pinion is rotated to an angle related to said slope;
   said means for indicating including a second arm disposed for concerted rotation with said pinion and a pointer on said second arm;
   a scale shelf adjacent said pointer;
   indicia on said scale shelf related to a gear appropriate to said slope; and
   means for permitting an angular adjustment of said pinion with respect to said second arm whereby a relationship between a value of said slope and an indication of a gear on said scale shelf appropriate for use with said slope may be changed.

* * * * *